Oct. 21, 1952 J. BROH 2,614,601
TRACTION DEVICE FOR VEHICLE WHEELS
Filed May 15, 1948 2 SHEETS—SHEET 1
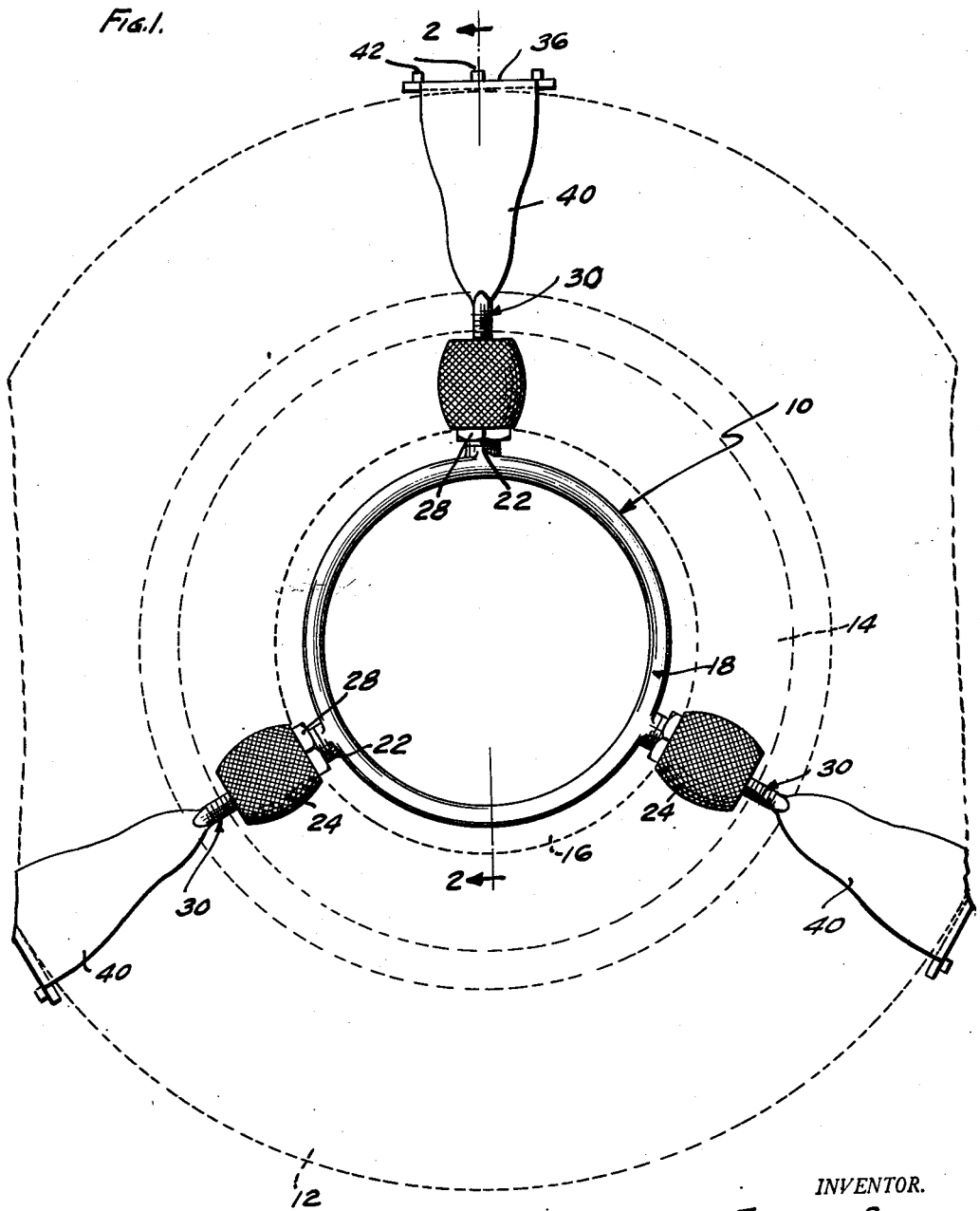
INVENTOR.
JOSHUA BROH
BY John B. Hasty
ATTORNEY.

Oct. 21, 1952 J. BROH 2,614,601
TRACTION DEVICE FOR VEHICLE WHEELS
Filed May 15, 1948 2 SHEETS—SHEET 2
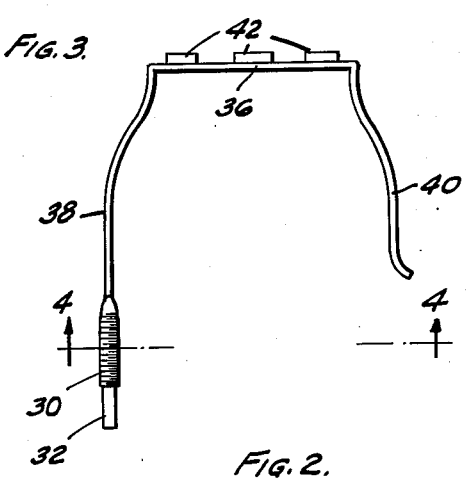
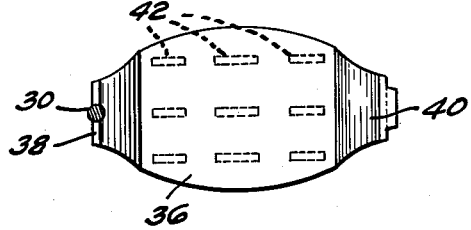
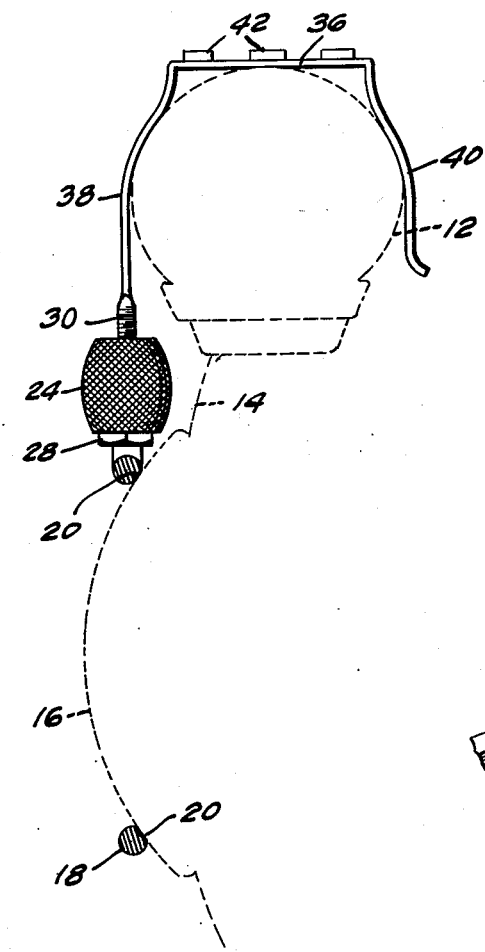
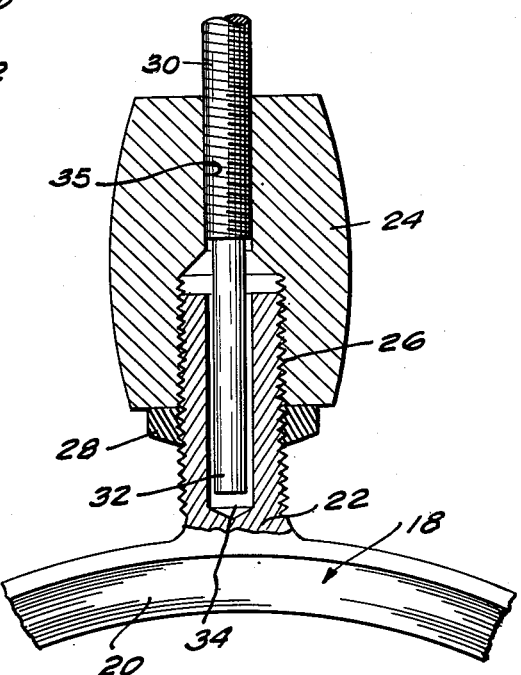
INVENTOR.
JOSHUA BROH
BY John B. Hasty
ATTORNEY.

Patented Oct. 21, 1952

2,614,601

UNITED STATES PATENT OFFICE 2,614,601

TRACTION DEVICE FOR VEHICLE WHEELS

Joshua Broh, East Chicago, Ill.

Application May 15, 1948, Serial No. 27,270

2 Claims. (Cl. 152—226)

My invention relates to improvements in traction devices for vehicle wheels.

My invention relates more particularly to an attachment capable of being fastened over the tires on the wheels of a motor vehicle, the same having a ring resting snugly over the hub cap of the wheels and gripping saddles or traction plates adapted to encircle the outer perimeter of the wheel tire in such position that they will assist in moving the motor vehicle when driving through mud, snow, sleet or other treacherous road surface where the smooth round tires of the vehicle are inclined to slip and slide either when brakes are applied or when the load is increased.

A further object of the invention is to provide a device of the type described which is comparatively simple in construction and capable of being attached to or removed from the tire of the vehicle wheel without the use of tools of any kind.

In addition, the construction which I have provided permits the application or removal of the traction device without the necessity of jacking up the wheels of the motor vehicle, it being only necessary that the car be in a stationary position during the time that the traction device is connected thereto.

A further object of the invention is to provide a device of the type described that is comparatively simple in construction with sufficient ease of application so that the ordinary layman or automobile owner can apply or remove the device both without the use of tools of any description and without being required to follow complex or difficult instructions.

A further object of the invention is to provide a device of the type described that is easily and cheaply manufactured, yet strong and durable so that it will not become easily broken or out of order.

Other objects and advantages will be more apparent from the following description wherein reference is had to the accompanying drawings, upon which Fig. 1 is a side elevational view of my improved traction device applied to the wheel and tire of a motor vehicle, the wheel and tire being shown in the drawing in dotted lines;

Fig. 2 is a vertical sectional view thereof taken on the line 2—2 of Fig. 1;

Fig. 3 is a side elevational view of the grip saddle shown disengaged from the supporting ring;

Fig. 4 is a bottom view thereof taken generally on the line 4—4 of Fig. 3; and

Fig. 5 is an enlarged cross-sectional view through the turnbuckle ring and associated parts.

In the embodiment of the invention which I have chosen to illustrate and describe, I have shown my improved traction device 10 applied to the tire 12 of a vehicle wheel 14 that also has the hub cap 16. This is in accordance with the usual construction of motor vehicle tire and wheels.

The traction device which I provide may include a centering ring 18 which has a tapered face 20 upon the inside thereof adapted to snugly fit against the arcuate surface of the hub cap 16. The centering ring may be provided with a plurality of threaded arms 22 extending radially outwardly therefrom. In the specific construction herein described I have shown three arms approximately 120° apart, but it is of course understood that for larger wheels or other different circumstances, four, five, or any desirable number of arms may be employed.

A turnbuckle 24, preferably oval in shape and provided with knurling upon its outer surface for easy gripping may have a screw-threaded opening 26 in one end thereof adapted to be screw-threadedly mounted upon one of the arms 22. A locking nut 28 is provided upon each of the arms for securely holding the turnbuckle in position when adjusted.

The grip saddles which I employ may each be provided with a connector rod 30 having a left-handed thread thereon and an extension 32 which normally centers the same in an axial opening 34 in each of the threaded arms 22. The connector rod is adapted to be screw-threadedly mounted in a tapped hole 35 in the end of the turnbuckle 24 axially aligned with the tapped opening 26. Thus by rotating the turnbuckle either clockwise or counter-clockwise, the connector rod 30 of the grip saddle will be drawn toward the centering ring or moved away from the same.

The grip saddle proper may have a plate-like portion 36 and side wall portions 38 and 40, the portion 40 terminating in the connector rod 30. The outer surface of the plate portion 36 is provided with a plurality of gripping teeth 42 arranged in rows as shown or in any other suitable or desirable manner which may be most successful in engaging a road surface to provide traction. The side walls 38 and 40 as shown in Figs. 2 engage the sides of the tire 12.

From the foregoing description it will be apparent to those skilled in the art that I have provided a comparatively simple traction device which is highly effective in assisting in providing traction to vehicle wheels in mud, rain, ice, sleet or snow. In an emergency when the same must be used, it is a simple matter to attach the same to a vehicle wheel, the grip saddle merely being placed about the edge of the tire with the connector rod engaging the turnbuckle. Then by turning the turnbuckle in the proper direction, the grip saddle will be drawn tightly against the outside periphery of the wheel, the lock nut 28 may be tightened to prevent any unwarranted loosening, and the device is ready for operation.

When the necessity for the same has ceased, it is a simple matter to loosen the lock nuts 28 on the arms 22, turn the turnbuckle in a reverse direction, and all of the grip saddles may be removed from the wheel. In this disassembled condition the entire unit may be placed in the tool box or luggage compartment of the vehicle until the next time that its use is required.

From the foregoing description it will be apparent to those skilled in the art that I have provided a comparatively simple yet rugged and workable traction device capable of being attached to or removed from a vehicle wheel without the use of tools and capable of being attached or removed by the average layman without requiring any degree of mechanical knowledge whatsoever. I contemplate that changes and modifications may be made in the exact details shown and I do not wish to be limited in any particular; rather what I desire to secure and protect by Letters Patent of the United States is:

1. A traction device for a vehicle tire comprising a centering ring adapted to be positioned against the arcuate surface of the hub cap of the vehicle wheel to center the same thereon, said centering ring member having a plurality of spaced radially outwardly extending threaded arms thereon, said arms having axial sockets therein, grip saddles partially encircling the periphery of the vehicle tire, threaded rods extending therefrom, turnbuckles connecting said arms and the threaded rods of said grip saddles, with the ends of said rods extending into the axial sockets of said arms, each of said turnbuckles being oval-shaped and having a serrated surface so that it can be rotated by hand, and a lock-nut on each threaded arm for each of said turnbuckles for holding the same in adjusted position.

2. A traction device for vehicle wheels comprising a ring member adapted to be positioned against the arcuate surface of the hub cap of a vehicle wheel, arms formed integral with said ring member and extending radially outwardly therefrom, a grip saddle connected to each of said arms and adapted to be positioned about the periphery of a tire mounted on said wheel, said ring member having a face complementary to and adapted to seat on the arcuate surface of the hub cap.

JOSHUA BROH.

REFERENCES CITED

The following references are of record in the file of this patent:

UNITED STATES PATENTS

| Number | Name | Date |
| --- | --- | --- |
| 1,537,592 | DuVall | May 12, 1925 |
| 1,643,167 | Miley | Sept. 20, 1927 |
| 2,174,345 | Worthing | Sept. 26, 1939 |
| 2,438,656 | Crumrine | Mar. 30, 1948 |
| 2,456,544 | Varner | Dec. 14, 1948 |